United States Patent
Gerstenmayer et al.

(10) Patent No.: US 6,878,944 B1
(45) Date of Patent: Apr. 12, 2005

(54) TWO-DIMENSIONAL DETECTOR OF IONIZING RADIATION AND METHOD FOR MAKING SAME

(75) Inventors: Jean-Louis Gerstenmayer, Orsay (FR); Serge Maitrejean, Paris (FR); Claude Hennion, Paris (FR); Irène Dorion, Paris (FR); Pascal Desaute, Paris (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/914,255

(22) PCT Filed: Feb. 23, 2000

(86) PCT No.: PCT/FR00/00448

§ 371 (c)(1),
(2), (4) Date: Aug. 24, 2001

(87) PCT Pub. No.: WO00/50922

PCT Pub. Date: Aug. 31, 2000

(30) Foreign Application Priority Data

Feb. 24, 1999 (FR) .............................................. 99 02289

(51) Int. Cl.⁷ ............................................... G01T 1/185

(52) U.S. Cl. .................................... 250/374; 250/385.1

(58) Field of Search ............................. 250/374, 385.1

(56) References Cited

U.S. PATENT DOCUMENTS

| | | | |
|---|---|---|---|
| 4,150,315 A | | 4/1979 | Yang |
| 4,427,870 A | * | 1/1984 | Inoue ...................... 219/69.12 |
| 4,476,390 A | * | 10/1984 | Hanawa ................... 250/385.1 |
| 4,816,683 A | * | 3/1989 | Marsden .................. 250/385.1 |

(Continued)

FOREIGN PATENT DOCUMENTS

| | | |
|---|---|---|
| EP | 0 678 896 | 10/1995 |
| FR | 2 739 941 | 4/1997 |
| FR | 2 762 096 | 10/1998 |

OTHER PUBLICATIONS

J–L. Gerstenmayer, Nuclear Instruments and Methods In Physics Research, vol. 422, No. 1–3, pp. 649–655, "High DQE Performance X–and Gamma–Ray Fast Imagers: Emergent Concepts", Feb. 11, 1999.

A. P. Jeavons, et al., Nuclear Instruments and Methods, vol. 124, No. 2, pp. 491–503, "The High–Density Multiwire Drift Chamber", Mar. 1, 1975.

M.Suzuki, et al., Nuclear Instruments and Methods In Physics Research, vol. A263, No. 1, pp. 237–242. "On The Optical Readout of Gas Avalanche Chambers and its Applications", Jan. 1, 1988.

(Continued)

*Primary Examiner*—Constantine Hannaher
*Assistant Examiner*—Shun Lee
(74) *Attorney, Agent, or Firm*—Oblon, Spivak, McClelland, Maier & Neustadt, P.C.

(57) ABSTRACT

Two-dimensional detector of ionizing radiation and process for manufacturing this detector This detector comprises sheets (4) emitting particles by interaction with ionizing radiation, semiconducting layers (6) that alternate with the sheets and can be ionized by the particles, and groups of conducting tracks (22) in contact with the layers. Means (26) of creating an electric field are used to collect charge carriers generated in the layers due to interaction with particles, through the tracks. For example, the layer and the corresponding tracks are formed on each sheet and the sheets are then assembled together. For example, the invention is applicable to radiography and can achieve good X-ray detection efficiency and high spatial resolution at the same time.

17 Claims, 4 Drawing Sheets

U.S. PATENT DOCUMENTS

| | | | | |
|---|---|---|---|---|
| 5,633,501 A | * | 5/1997 | Amleshi et al. | 250/385.1 |
| 5,959,302 A | * | 9/1999 | Charpak | 250/385.1 |
| 6,133,575 A | | 10/2000 | Charpak et al. | |

OTHER PUBLICATIONS

V. Perz–Mendez, et al., IEEE Trans. Nucl. Sci., NS–21, pp. 45–50, "Recent Development In Delay Line Readout of Multiwire Proportional Chambers", 1974.

S. N. Kaplan, et al., Nuclear Instruments and Methods, vol. 106, pp. 397–406, "Multiwire Proportional Chambers for Biomedical Application", 1973.

J–L. Gerstenmayer, et al., SPIE, vol. 2859, pp. 107–114, Multi Step Parallel Plate Avalanche Chamber As A 2D Imager For MeV Pulsed Radiography, Aug. 7–8, 1996.

U.S. Appl. No. 09/926,328, Filed Oct. 15, 2001, Pending.

* cited by examiner

TWO-DIMENSIONAL DETECTOR OF IONIZING RADIATION AND METHOD FOR MAKING SAME

BACKGROUND OF THE INVENTION

1. Field of the Invention

The present invention concerns a bidimensional detector of ionizing radiation as well as a manufacturing process for this detector.

The ionizing radiations which can be detected by the invention can particularly consist of X-rays, gamma photons, protons, neutrons or muons.

The detector, subject of the current invention, is capable of converting incident ionizing radiation into particles, which are themselves ionizing (electrons for example) and are easier to work with than the incident ionizing radiation.

In particular, the invention may be used in the following sectors:

- instantaneous radiography of highly absorbing and/or voluminous objects,
- ultra rapid cineradiography of mechanical mobiles,
- positioning of patients in radiotherapy,
- neutronography,
- protonography,
- medical and biological imagery (tomographies by emission of positrons), and
- imagery by coded apertures to inspect voluminous objects with low radioactivity or suspicious parcels in a passive or quasi-passive manner.

2. Discussion of the Background

Bidimensional detectors of ionizing radiation are already known and consist of plates made of a heavy metal such as lead, or, more precisely, of a material with a high cross-section of interaction with an incident ionizing radiation.

For example, it is common to use a metal with an atomic number (Z) greater than or equal to 73 to detect X or gamma photons and a metal with an atomic number (Z) generally less than 14 or greater than 90 to detect neutrons.

Other materials, such as Gadolinium (Z=64) can also be used to detect neutrons.

Holes are drilled in the metal plates using either chemical or electrochemical etching. The plates are electrically insulated from each other if necessary, that is, when plate thickness is equal to, or greater than, a few hundred micrometers.

The holes are filled with an ionizable gas.

A high-energy incident photon (X- or gamma-) then generates at least one electron in one of the detector plates, either by Compton effect or pair-creation effect.

The incident X or gamma photon causes the released electron to move rapidly with a kinetic energy approximately equal to that of the incident photon. The electron then rapidly ionizes some molecules of the gas contained in one of the holes which the electron reaches and, generally, passes through. Slow secondary electrons which are removed from these molecules due to the ionization of the molecules, are routed along this hole and collected by means of a bias electric field, also referred to as a drift field. The slow secondary electrons are then detected in, for example, an ionization chamber or in a proportional avalanche chamber.

Such bidimensional detectors are for example described in documents [1], [2], [3], [6], and [7] which, like the other documents referenced hereafter, are listed at the end of the present description.

The decision to use a hole-detection system can be explained by the fact that such a system offers a very high degree of spatial resolution and offers a high level of performance, subject to the holes being perfectly formed and sufficiently wide.

The holes are created by means of chemical etching. This procedure is preferable to waterjet cutting which suffers from the disadvantage of generating a frontal shock when the waterjet is turned on in the beginning of the drilling of a hole.

This frontal shock chips the material in which the holes are to be cut, which splits the material and makes it unfit for use.

However chemical etching is an expensive and slow process.

Moreover, the quantity of secondary electrons collected, and by extension, the performance levels of hole-system detectors are limited since only between 10% to 30% of the secondary electrons created in the course of each gas ionization are collected.

This can be explained by the fact that chemical etching does not create holes whose interior walls are perfectly cylindrical, that is, it cuts bottlenecks in the holes which in turn causes the electric field line to be deformed and reduces the useful diameter of the holes. Thus, the performance levels of hole-system detectors are low.

SUMMARY OF THE INVENTION

The objective of the present invention is a detector that remedies the aforementioned inconveniences of hole-based detector (that is, expensive and low performance levels). The present invention proposes to meet this objective, in part, by using slits instead of holes.

To reformulate the above in a more precise manner; the objective of the present invention is a bidimensional ionizing radiation detector intended for use with incident radiation consisting of primary particles whose energies are greater than, or equal to 100 keV. Furthermore, the detector includes a block featuring a converting material capable of releasing secondary particles by interaction with the incident ionizing radiation, whereby the thickness of the block is at least equal to one-tenth of the mean free path traveled by the primary particles of the incident radiation in the material. The detector is characterized by the fact that it has parallel slits running across the block, which are filled with a fluid capable of interacting with the secondary particles to produce tertiary particles equal in intensity and position to the incident radiation whereby the block is positioned in such a manner as to ensure that the incident radiation comes in on a first face where the slits terminate.

These slits divide the block into strips.

The detector is far less expensive to manufacture than the hole-system detectors previously mentioned.

Moreover, the detector's collection performance and spatial resolution are liable to be far better than the hole-based system.

The detector is also easy to manufacture, and offers a very important useful detection surface.

Under a first specific manufacturing mode, the slits of the detector are perpendicular to the first block face.

Under a second specific manufacturing mode, the slits planes create an angle of between 1° to 5° with a line perpendicular to the first block face.

Under a specific manufacturing mode of the detector, the fluid in the slits may be ionized by secondary particles (for example, energetic electrons produced by Compton effect), thereby causing the fluid to produce electrons by ionization which may be considered tertiary particles. Furthermore, the detector includes the technology required to create an electric field capable of extracting these electrons from the block.

To this end, an ionizable gas is used, for example.

The detector may also analyze the extracted electrons.

The analysis feature of the detector may include an avalanche gas amplifier, capable of producing electron avalanches from the block-extracted electrons.

In this case, an ionizable gas may be used, capable of converting the electron avalanches into visible or ultraviolet radiation, and the technology required to analyze visible or ultraviolet radiation may be integrated into the detector.

The detector may include a camera capable of detecting the visible or ultraviolet radiation, or a matrix of amorphous silicon photodiodes placed against the avalanche gas amplifier.

Under a first specific manufacturing mode of the invention, the material includes an electrical conductor, and the block consists of stacked layers of this material, whereby these layers alternate with electrically insulating layers. Under this first version, the stack begins with a layer of conducting material on the first face of the block, and ends with a layer of conducting material on the second face of the block, located opposite the first face, and on which the slits terminate. The detector also includes the aforementioned conducting layers connected to electric voltage that increases from the first face to the second face in order to create an electric field.

The layer of material on the second block face can be blackened out in order to avoid parasitic light reflections, in particular, ultraviolet.

Under a second specific manufacturing mode for the invention, the material includes an electric insulator (or offers high electrical resistivity) and the block consists of stacked layers of this material or alternatively, is a single mass of this material. Moreover, the block includes first and second layers or grills which are electrical conductors and are located on the first block face and second block face respectively, whereby the second block face is opposite the first face and on which the slits terminate. An electric field is created by applying an electric voltage to the first layer or grill and a different electric voltage to the second layer of grill which is greater than the first voltage, thereby creating a drift current, from which the tertiary particles (ionization electrons) created by ionization of the fluid, may be extracted.

Under another specific manufacturing mode for the invention, the block includes a stack of strips made from an isolating (or highly resistive) converting material, and separated from each other by spacers chosen so as to define the parallel block slits. Furthermore, under this option, the block includes first and second layers or grills which are electrical conductors and are located on the first block face and second block face respectively, whereby the second block face is located opposite the first face and on which the slits terminate. An electric field is created by applying an electric voltage to the first layer or grill and a different electric voltage to the second layer of grill which is greater than the first voltage.

The present invention also concerns the manufacturing process for the detector.

Under the premises of this manufacturing process, the block is firstly created, after which the slits are created by choosing one of the following three techniques:

waterjet cutting, electrical discharge machining, or, roll-out stretch wire.

Under a specific implementation mode for the procedure, applicable for the manufacturing of the detector and compatible with the aforementioned first and second specific manufacturing modes (utilization of an electrical conducting material or utilization of an insulating/highly resistive material), the layers which are used are stacked against each other.

Before creating the slits, a guide hole may be created in the block, which will be used as a basis to create the slits.

BRIEF DESCRIPTION OF THE DRAWINGS

The present invention will be easier to understand from the following manufacturing examples, given by way of indication and in no way limiting. Reference is made to the following annexed drawings.

DESCRIPTION OF THE PREFERRED EMBODIMENTS

Figure 1:
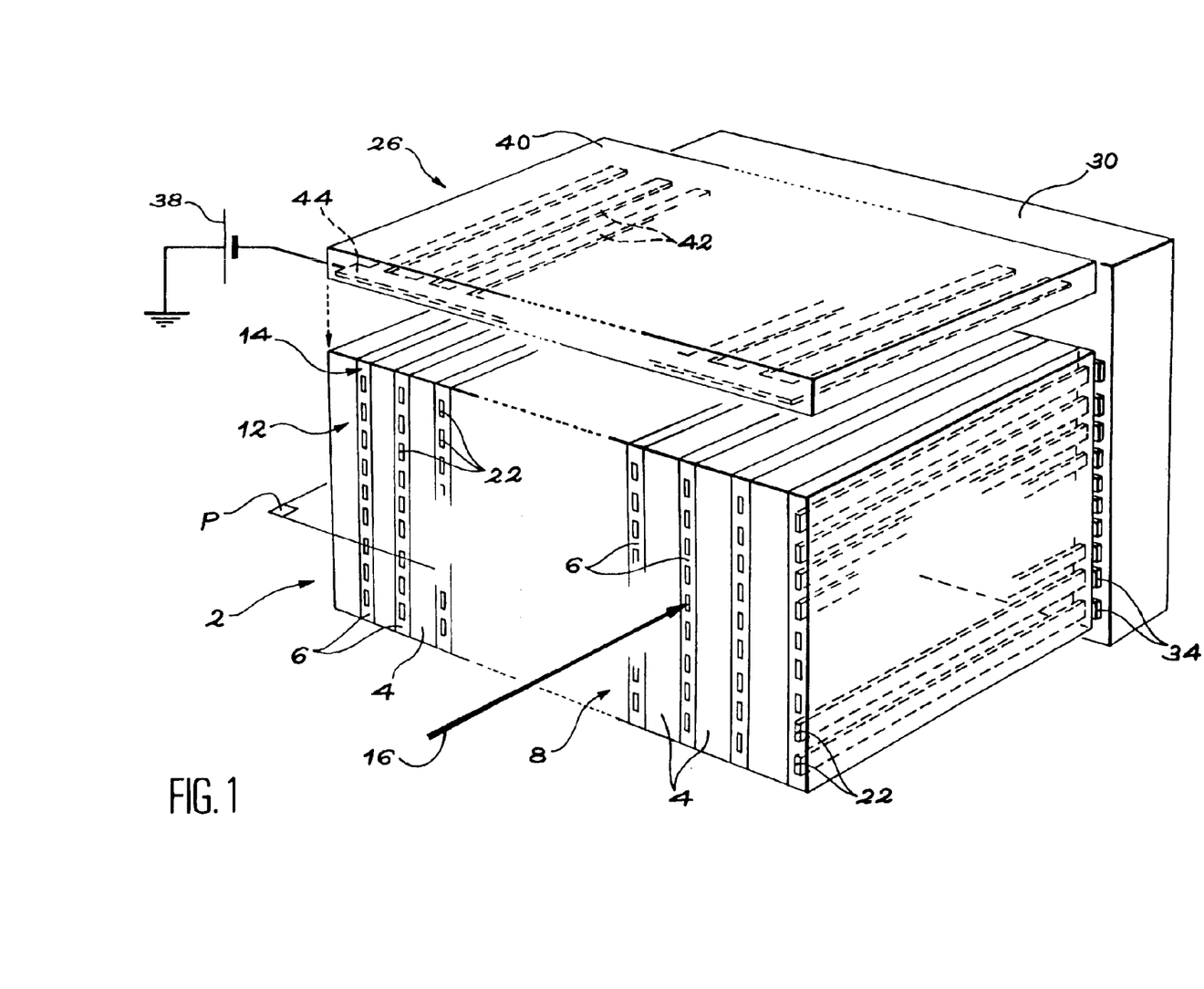
FIG. 1 is a schematic perspective view of specific manufacturing mode according to a possible embodiment of the detector.

The bidimensional detector of incident ionizing radiation having an energy greater than, or equal to, 100 keV (as per the precepts of the invention), an embodiment of which is schematically shown in FIG. 1, comprises a block (2) formed from a converting material, offering a high interaction cross section with respect to the incoming ionizing radiation.

Figure 2:
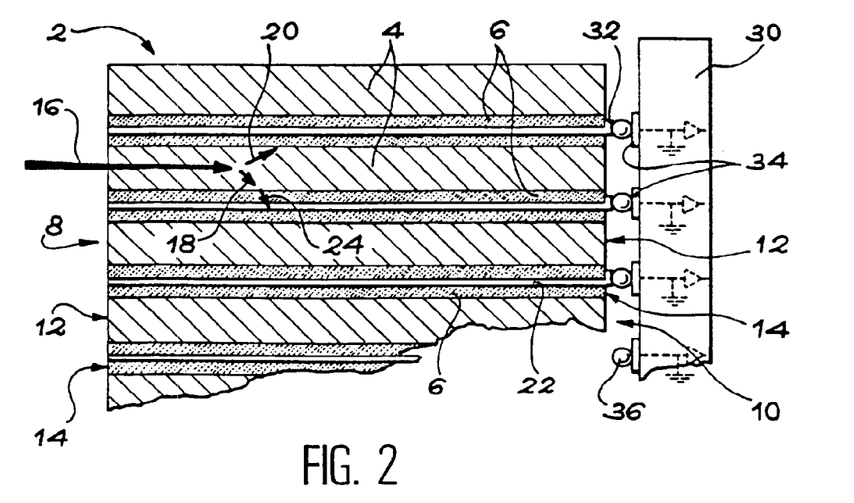
FIG. 2 is a schematic transversal sectional view of an embodiment of the detector of FIG. 1, from a plane P, shown on the sectional view.

In the case of FIG. 1, this material includes an electrical conductor and, as may be seen on FIG. 2, the block itself is a stack of layers (4) of this material, whereby these layers (4) alternate with electrical insulating layers (6).

The stack begins with one of the layers (4) in the first face (7) of the block, through which the ionizing radiation penetrates into the block (2). The stack also terminates with one of these layers (4) in the second face (8) of the block, which is located opposite the first face (7).

In the example shown, the detector is intended to detect X photons which have an energy of 5 MeV, for example.

An incident X photon whose path is indicated as (9) on FIGS. 1 and 2 interacts with the material of one of the layers (4) to produce, either by Compton effect or pair-creation effect (electron, positron), an electron with a high kinetic energy, whose path is indicated by the arrow (10) on FIG. 2.

Another arrow (12) has also been used to represent the path of the photon whose energy is less than that of the incoming X photon and which results from the interaction of the latter with the material.

The thickness of block 2 (counting from the first face (7) to the second face (8) of the block), indicated as E, is at least equal to ⅒ of the mean free path of the incident X photons in the conducting material, which gives the material its high stopping power.

In keeping with the invention, the detector shown in FIGS. 1 and 2 also features parallel slits (14).

In a purely illustrative but in no way limitative manner, the detector is arranged Figure in such a way that the slits are either horizontal or, on the contrary, vertical. However any other orientation is possible, depending on the intended utilization of the detector.

The slits (14) run across the block (2) from the first face to the second face thereof, thereby splitting up the block into strips. The slits (14) are filled with a gas (in a manner explained later in this document), which is ionizable by the electrons resulting from the interaction of the incident radiation with the converting conductive material.

Electrons created in this fashion interact with the gas in a slit (14) to produce positive ions, such as the ion shown by the arrow (16) and electrons, such as the electron shown by the arrow (18) in FIG. 2.

It should be mentioned that the slits (14) which terminate on faces (7) and (8), are perpendicular to the faces (7) and (8).

The detector shown in FIGS. 1 and 2 also comprises means for creating an electric field capable of extracting from block (2) the electrons resulting from gas ionization. This is done by provoking the displacement of the electrons in the slits where they are created, towards the face (8).

This is illustrated in FIG. 2 for the electron whose path bears the reference (18).

The ion corresponding to this electron is driven towards the first face (7) under the effect of the electric field.

In the example shown in FIGS. 1 and 2, the electric field is created by biasing means which raise the layers of conducting material (4) to voltages which increase from the first layer, located at the first block face (7) to the last layer (4), located at the second face (8).

Block (2) may be placed in a hermetic enclosure (20) containing the ionizable gas.

Alternatively, the enclosure (20) may be provided with means (not shown) for circulating and purifying the gas.

The enclosure (20) comprises a window (22) which is transparent to the incident ionizing radiation and situated opposite the first face (7) of the block (2).

In the example shown, the window (22) is made of aluminum and transparent to the incident X-rays. However, if necessary, other materials can also be used.

The biasing means allowing the conducting material layers (4) to be raised to increasing voltages comprises series-mounted electric resistors R1, R2, . . . Rn (FIG. 2).

Each terminal shared by 2 series-mounted adjacent resistors is connected to one of layers (4) of the conducting material, with the first terminal of the first resistor (R1) connected to the first layer (4) of conducting material, located opposite the window (22), whereas the second terminal of the last resistor (Rn) is connected to the last layer (4) of conducting material, located at the second face (8) of the block (2).

These resistors are formed outside the enclosure (20) and connected to the layers (4) of conducting material through electrically insulating passages (not shown) in the enclosure (20). However, the resistors can also be formed inside the enclosure.

These resistors are formed, for example, by etching a conducting layer in, for example, gold, whereby this conducting layer is formed on an element made of an electrically insulating ceramic (not shown).

The respective resistor values are adjusted by thinning this etched layer, using for this purpose, for example, laser evaporation techniques.

One thus obtains the increasing electric voltages, that is, a voltage gradient with the first terminal of the first resistor (R1) at ground potential and the second terminal of the last resistor (Rn) at a high positive voltage.

The detector shown in FIGS. 1 and 2 also comprises means for analyzing the electrons extracted from block (2) via the electric field, and which leave block (2) by the second face (8).

This electron analysis means includes an avalanche gas amplifier (24) capable of producing electron avalanches from the electrons extracted from the block (2).

As may be seen from FIG. 2, this amplifier (24) has 2 electrically conducting grids (26 & 28) which are placed in the enclosure (20), in front of the second face (8) of block (2) and which arc parallel both to each other and to this second face (8).

The first grid, that is, the one nearest the second face (8) is raised up to a positive voltage, greater than the voltage applied to the second terminal of the last resistor (Rn), and the second grid (28) is raised up to a positive voltage, greater than the voltage applied to the first grid (26).

In the example shown, the first and second grids are raised up to a voltage of 10 kV and 16 kV respectively, whereas the layer (4) nearest the window (7) is grounded and the layer (4) nearest the grid (26) is raised to a voltage of 8 kV.

Other types of avalanche amplifiers can also be used; for example PPAC, "Micromegas" (se documents [4] and [5]) or GEM type avalanche amplifiers.

Attention is drawn to the fact that the ionizable gas is a mixture of:
- a gas, e.g. Argon, allowing for the multiplication, by avalanche, of electron extracted from block 2,
- a gas, e.g. dimethyl ether or DME, allowing for the avalanche amplification coefficient to be controlled, and
- a gas or vapor, e.g. triethylamine or TEA, capable of scintillation under the effect of the electron flow in the avalanche.

In a purely illustrative and in no way limitative manner, a mixture consisting of 86% Argon, 12% DME, and 2% TEA is used.

Examples of avalanche gas amplifiers are given in the documents [4] and [5].

Every electron leaving the block (2) via the second face (8) of the block (2) is successively accelerated by the conducting grids (26 & 28), thereby creating an electron avalanche (29), concentrated essentially between these two grids.

Moreover, this avalanche generates an ultraviolet radiation (30) by interaction with the TEA.

The enclosure (20), opposite the second grid (28), comprises a window (32) which is transparent with respect to this ultraviolet radiation (made out of quartz, for example).

Outside the enclosure (20), opposite this quartz window (32), a camera (34) capable of detecting the ultraviolet radiation (30) is fitted.

Naturally, if the chosen gas mixture gives off visible radiation by interaction with the electron avalanche, then the camera chosen must be capable of detecting such a radiation and the window (32) must be transparent with respect to this radiation.

Moreover, instead of using a camera, a matrix of amorphous silicon photodiodes (not shown) may also be used to detect the visible or ultraviolet radiation resulting from the interaction of the gas mixture with the electron avalanches.

In this case, the matrix is affixed against grid (28), which increases compactness and reduces weight.

Parasitic reflections of visible or ultraviolet light can be avoided by, for example, oxidizing the appropriate metal, and so blacking out the face of the layer (4) located opposite the grid (26).

Figure 3:
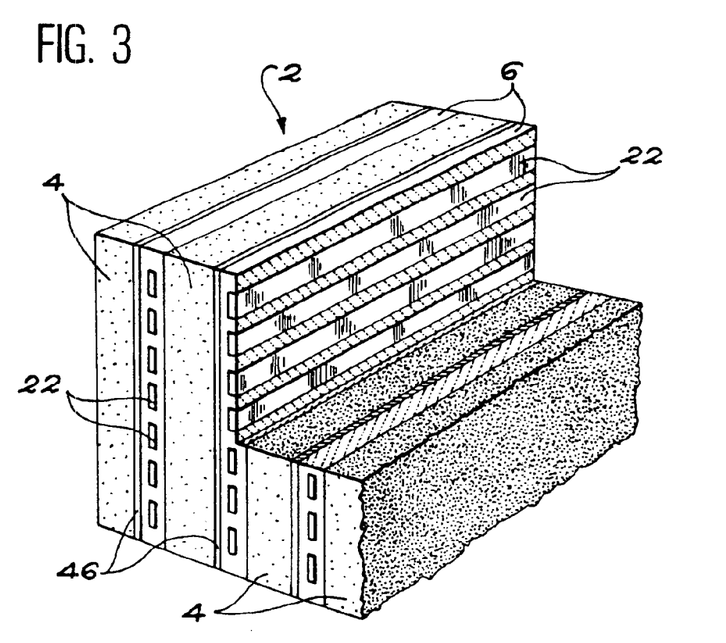
FIG. 3 is a schematic perspective view of another detector embodiment designed in accordance with the invention.

The block (2) shown in FIGS. 1 and 2 can be replaced by the block (36), whose perspective is schematically represented in FIG. 3.

In the case of FIG. 3, an electrically insulating material (for example, ceramic, glass, or plastic material), or a highly resistive material (for example, ceramic material or oxide (having a resistivity of at least $10^5$ Ωcm) is used where block (36) is a stack of layers (37) of this material, or can alternatively, be made from this material in the bulk state.

In the case of FIG. 3, block (36) also comprises a first conducting layer (38) and a second conducting layer (40) formed respectively, at the first face and the second face of block (36).

The conducting layers (38 & 40) can be replaced by conducting grids.

FIG. 3 also shows the parallel slits (14) running across the block (36), which are perpendicular to the first and second block faces. These slits divide the block into strips.

In this case, the electric field is generated by using means (not shown) capable of raising the second conducting layer (40) to a high positive voltage, whereas the first conducting layer (38) is grounded.

In a purely illustrative but in no way limitative manner, layers (4) are in tungsten and layers (6) are in KAPTON (trademark) or other plastic or plastic-like strip, the distance between the second face (8) and the first grid (26) is 1.5 mm and the distance between the two grid (26 & 28) equals 3 mm, the thickness of block (2) or block (36) is 30 mm, the thickness of the conducting layers (4) is 250 $\mu$m, the thickness of the insulating layers (6) is between 50 $\mu$m and 500 $\mu$m, the thickness of the conducting layers (38 & 40) is 10 $\mu$m, these conducting layers (38 & 40) are in copper, the width of the slits (14) is 500 $\mu$M, their length (L) varies from 10 cm to 50 cm and these slits are separated from each other by about 700 $\mu$m.

Instead of tungsten, lead or depleted uranium could also be used to form layers (4).

Figure 4:
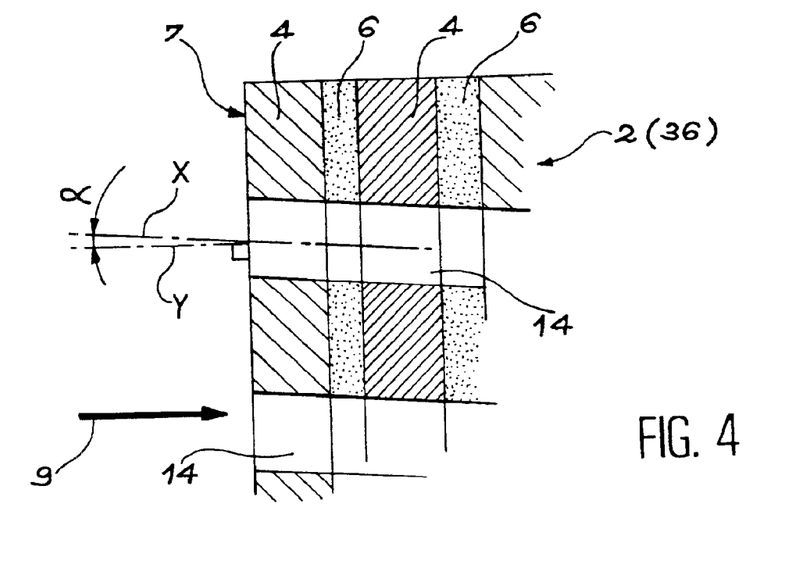
FIG. 4 is a schematic and partial transversal sectional view of another detector embodiment designed in accordance with the invention

Instead of being perpendicular to the first face (7) of block (2) or block (36), the slits (14) or, more precisely, the slits' planes, that is, the mid-perpendicular planes of the slits, which extend along the length of the slits (14) and have a trace shown as (X) in the section plane of FIG. 4, can create an angle a of between 1 and 5° with a plane (whose trace is shown as Y), which is perpendicular to this first face (7) as illustrated in FIG. 4.

This has the advantage of increasing the stopping power with respect the incident ionizing radiation, subject to the detector being positioned in such a way that the incoming radiation arrives at face (7) of block (2) or block (36), and in a direction perpendicular to the layers (4) or (38).

Moreover, it should be noted that the thickness of blocks (2) and (36) is chosen on the basis of the desired stopping power.

Moreover, the dimensions of the slits (14) and the layers in blocks (2) or (36) are chosen to optimize the spatial resolution of the corresponding detector, and the performance level of this detector for collecting the electrons generated in the slits.

It should be noted that, under the previous state-of-the-art, the total thickness of the metal plates (thickness counted parallel to the incident ionizing radiation) was chosen so as to make metal plate etching possible.

In the detector of FIGS. 1 and 2, and, likewise in the detector of FIG. 3, the total thickness of the layers in blocks (2) or (36) is entirely determined by limitations for implementing the electric field (or more precisely, the electrostatic field).

These layers can be very thin or, on the contrary, very thick since slits can still be machined.

Using slits in accordance with the present invention, instead of holes, dramatically improves the detector's performance level but also, which is unexpected, the spatial resolution of the detector.

Indeed considering the example of FIG. 2, the spatial resolution along the direction D1 perpendicular to slits (14) is determined by the gap between these slits, and along a direction D2 perpendicular to D1 the spatial resolution does not limit the scattering of the electrons which drift in the slits, but experiments show that this electron scattering is not very important and in fact, has a probability distribution whose width at half maximum is less than the gap between the slits (14) with a slit gap equal to, for example, 500 $\mu$m+700 $\mu$m=1.2 mm.

Figure 5:
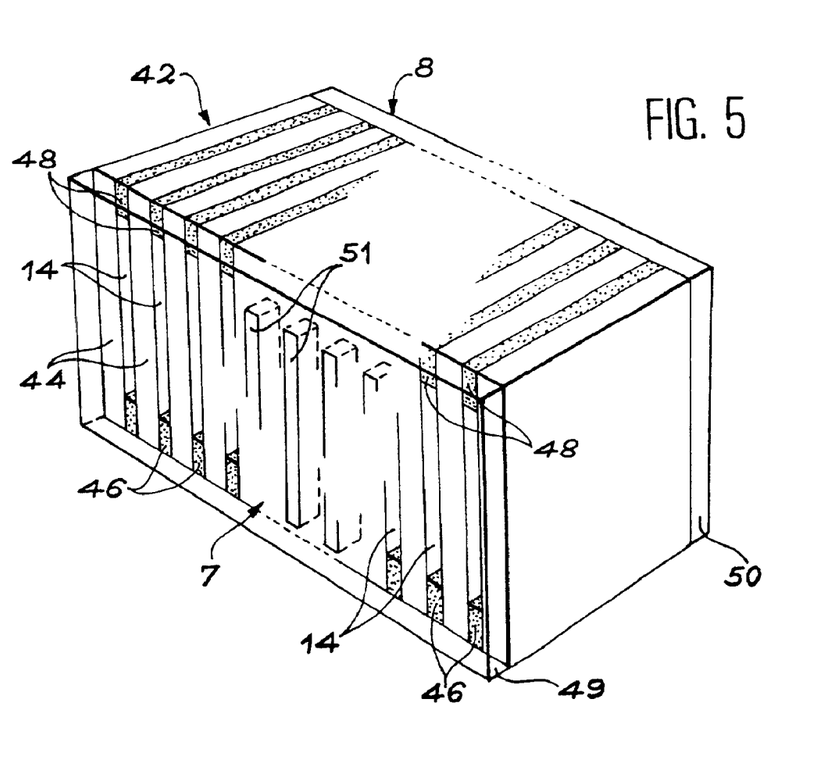
FIG. 5 is a block diagram of another detector embodiment designed in accordance with the invention.

FIG. 5 represents a schematic perspective view of another detector designed in accordance with the present invention.

In the case of FIG. 5, the detector comprises a block (42) which consists of a stack of strips (44) made from an insulating (or highly resistive) converting material, for example, in ceramic or plastic, whereby the strips are separated from each other by lower spacers (46) and upper spacers (48).

These spacers are made of plastic, for example.

The spacers allow the slits (14) to be created between the strips, whereby each slit (14) is delimited by two adjacent plates, one lower spacer (46) and one upper spacer (48).

As was previously the case, the slits (14) are filled with a fluid medium which is ionizable by the particles released during the interaction of the incident ionizing radiation with the strips (44).

The block (42) also comprises a first conducting layer (49) and the second conducting layer (50) formed, respectively, at the first face and the second face of the block to create an electric field by raising the first layer (49) to a first electric voltage and the second layer (50) to a second voltage which is greater than the first voltage, whereby the resulting electric field makes it possible to extract the electrons created by ionization from block (42).

As was also the case in FIG. 3, one can replace the layers (49) and (50) by two electrically conducting grids, one at the first block face, and the other at the second block face.

As may be seen on FIG. 5, the layers (or grids) (49) and (50) have slits, such as slits (51), respectively located opposite slits (14) and extending slits (14).

We shall now give some examples of manufacturing procedures for a detector designed in accordance with the precepts of the current invention.

If the block consists of alternating conducting/insulating layers, one begins by fixing these layers to each other, by gluing them together, for example.

If the block is made from a bulk insulating material, one begins by attaching the two conducting layers to the first and second faces, respectively, of this bulk block, by gluing them together, for example.

Once the block has been created, the slits are then formed by, for example, waterjet cutting, electrical discharge machining or roll-out stretch wire.

It should be specified that gluing has the advantage, especially in the case of waterjet cutting, of preventing accidental dispersion of the waterjet between the layers during the cutting.

Before creating a slit, a hole may be formed through the block, which will be used as a basis to create the slit using, for example, a waterjet applied through a nozzle, which is moved around with respect to the block.

Such a hole, which can be formed by, for example, chemical etching or any other technique, present the advantage of avoiding frontal shock when the waterjet is first turned on.

However, such holes are not necessary if the material used for forming the block do not crack.

Creating the slits is therefore a very rapid process.

As an ionizable fluid medium, instead of using an ionizable gas, one can also use a liquid, for example, Xe, or a supercritical phase such as $CO_2$, for example, (in supercritical phase).

Figure 6:
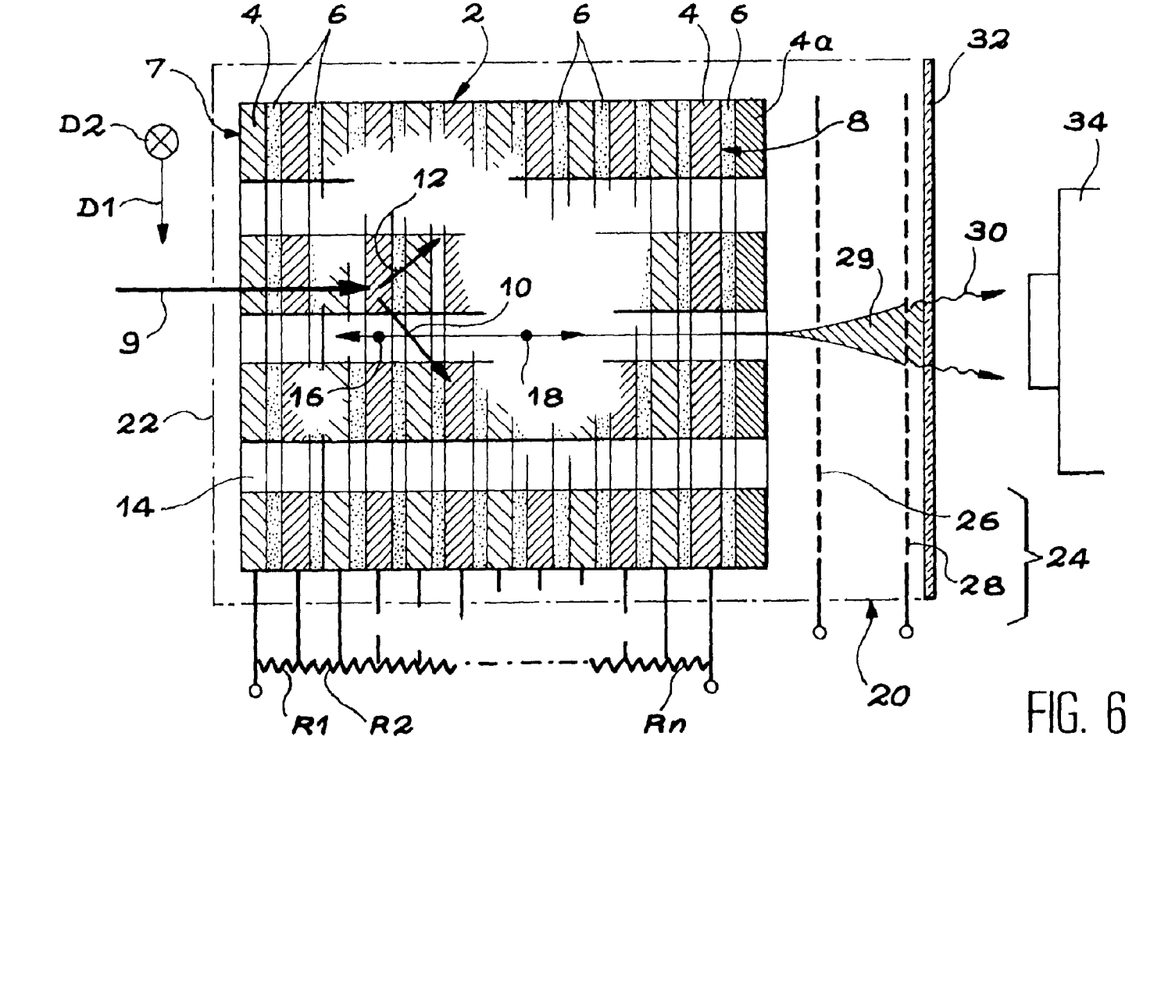
FIG. 6 is a block diagram of a possible variation of the detector embodiment mentioned in FIG. 2.

FIG. 6 schematically illustrates a variation of FIG. 2. The detector in FIG. 6 comprises a supplementary insulating layer (6) formed on the last layer (4) located at the second face (8) of block (2) and an electrically conducting layer (4a) formed on this supplementary layer (6). The layer (4a) (through which slits (14) run, as is also the case for the adjacent layer (6)) is made of an absorbing electrical conducting material, whose role is to absorb the secondary particles created in the last layer (4), whereby the objective is to improve spatial resolution by preventing the secondary particles from directly penetrating into the avalanche gas amplification over at a large angle (which would create blur).

The detector, subject of the present invention, may be used, for example, for positron emission tomographic applications (PET scanner with an incident energy of about 0.5 MeV) or in radiotherapy with energies of about 1 MeV. If the incident radiation is made up of X photons, the detector may be used in all situations where the photoelectric effect is negligible compared to the other types of interaction (for example, Compton effect or pair-creation effect).

The documents mentioned in the present description are:

[1] V. Perez-Mendez, S. I. Parker, IEEE Trans. Nucl. Sci. NS-21 (1974) 45

[2] S. N. Kaplan, L. Kaufman, V. Perez-Mendez, K. Valentine, Nuclear Instruments and Methods 106 (1973) 397

[3] A P Jeavons, G. Charpak, R J Stubbs NIM 124 (1975) 491–503

[4] FR 2739941 A, "Detécteur de position, à haute résolution, de hauts flux de particules ionisantes". Invented by G. Charpak, I. Giomatris, Ph. Rebourgeard and J. P. Robert—See also international application WO 97/14173

[5] FR 2762096 A, "Détecteur de particules à électrodes parallèles multiples et procédé de fabrication de ce détecteur". Invented by G. Charpak, I. Giomatris, Ph. Rebourgeard and J. P. Robert—See also EP 0872874 A

[6] J. L. Gerstenmayer, D. Lebrun, and C. Hennion, "Multistep Parallel Plate Avalanche Chamber as a 2D imager for MeV pulsed radiography". SPIE Proceedings, vol. 2859, pages 107 to 114, SPIE symposium, 7–8 Aug. 1996, Denver, Colo.

[7] J. L. Gerstenmayer, "High DQE performance X- and Gamma-ray fast imagers: emergent concepts", 1998 Symposium on Radiation Detection and Measurement, Ann Arbor, Mich., 11–14 May 1998, Proceedings in Nuclear and Methods in Physics Research A.

What is claimed is:

1. Detector for incident ionizing radiation comprising primary particles whose energies are greater than or equal to 100 keV, the detector including:
a block of converting material configured to release secondary particles by interaction with the incident ionizing radiation, wherein a thickness of the block is at least equal to one-tenth of a mean free path traveled by the incident ionizing radiation through the converting material;
parallel slits crossing the block, the slits filled with a fluid configured to interact with the secondary particles to produce tertiary particles indicative in intensity and position of the incident ionizing radiation,
wherein the block is positioned to ensure that the incident ionizing radiation comes in on a first block face where the slits terminate,
wherein the fluid is configured to be ionized by the secondary particles, thereby producing electrons as the tertiary particles, and the detector further includes means for creating an electric field for extracting the tertiary particles from the block, and
wherein the converting material is an electrical conductor and the block is formed from stacked layers of the converting material, wherein the stacked layers alternate with electrically insulating layers and the stacked layers begin with a conducting layer of the converting material on the first face of the block and end with a conducting layer of the converting material on a second face of the block, which is opposite the first face and on which the slits terminate, and the detector further includes means for applying electric voltages to the stacked layers, with electric voltages increasing from the first face to the second face, thereby creating said electric field; and
said detector further including a supplementary layer formed on an additional electrically insulating layer, the additional electrically insulating layer being formed on the last layer of the converting material, located at the second face of the block, wherein the supplementary layer is made of an electrically conducting material configured to absorb the secondary particles created in the last layer, and the supplementary and additional layers have said slits running through them.

2. Detector as described in claim 1, wherein the slits are perpendicular to the first face of the block.

3. Detector as described in claim 1, wherein slit planes form an angle of between 1° and 5° with a line perpendicular to the first face of the block.

4. Detector as described in claim 1, wherein the fluid is a gas.

5. Detector as described in claim 1, further comprising means for analyzing the electrons extracted from the block.

6. Detector as described in claim 5, wherein the means for analyzing includes an avalanche gas amplifier for producing electron avalanches from the electrons extracted from the block.

7. Detector as described in claim 6, wherein the fluid is a gas and is configured to convert the electron avalanches into visible or ultraviolet radiation, and the means for analyzing further includes means for detecting the visible or ultraviolet radiation.

8. Detector as described in claim 7, wherein the means for detecting the visible or ultraviolet radiation includes a camera capable of detecting the visible or ultraviolet radiation, or a matrix of amorphous silicon photodiodes placed against the avalanche gas amplifier.

9. Detector manufactured according to claim 1, wherein the layer of the converting material located at the second face of the block is blackened out to prevent parasitic light reflections.

10. Detector manufactured according to claim 1, wherein the converting material is electrically insulating, or highly resistive, and the block is formed from stacked layers of the converting material or is made from the converting material in a bulk state, wherein the block further includes first and second layers or grids which are electrically conducting and formed, respectively, on the first block face and on a second block face which is located opposite the first block face and on which the slits terminate, and the electric field is created by raising the first layer or grid to a first voltage and the second layer or grid to a second voltage which is greater than the first voltage.

11. Detector as described in claim 1, wherein the block is made from a stack of strips made from an insulating or highly resistive converting material, and the strips are separated from each other by spacers which define the parallel slits of the block, wherein the block further includes first and second layers or grids which are electrically conducting and formed respectively, on the first block face and on a second block face which is located opposite the first face and on which the slits terminate, and the electric field is created by raising the first layer or grid to a first electric voltage and the second layer or grid to a second electric voltage which is greater than the first voltage.

12. Manufacturing process for the detector of claim 1, wherein the block is firstly manufactured and then the slits are manufactured by one of the following techniques:

waterjet cutting, electrical discharge machining, roll-out stretch wire.

13. Manufacturing process as described in claim 12, wherein the fluid is configured to be ionized by the secondary particles, thereby producing electrons as the tertiary particles, and the detector further includes means for creating an electric field for extracting the tertiary particles from the block, wherein the converting material is an electrical conductor and the block is formed from stacked layers of the converting material, wherein the stacked layers alternate with electrically insulating layers and the stacked layers begin with a conducting layer of the converting material on the first face of the block and end with a conducting layer of the converting material on a second face of the block, which is opposite the first face and on which the slits terminate, and the detector further includes means for applying electric voltages to the stacked layers, with electric voltages increasing from the first face to the second face, thereby creating said electric field, wherein the layers are stuck to each other.

14. Manufacturing process as described in claim 12, wherein, before creating each slit, a guide hole is made in the block which is then used to create the slit.

15. Manufacturing process as described in claim 12, wherein the fluid is configured to be ionized by the secondary particles, thereby producing electrons as the tertiary particles, and the detector further includes means for creating an electric field for extracting the tertiary particles from the block, wherein the converting material is electrically insulating, or highly resistive, and the block is formed from stacked layers of the converting material or is made from the converting material in a bulk state, wherein the block further includes first and second layers or grids which are electrically conducting and formed, respectively, on the first block face and on a second block face which is located opposite the first block face and on which the slits terminate, and the electric field is created by raising the first layer or grid to a first voltage and the second layer or grid to a second voltage which is greater than the first voltage, wherein the layers are stuck to each other.

16. Detector for incident ionizing radiation comprising primary particles whose energies are greater than or equal to 100 keV, the detector including:

a block of converting material configured to release secondary particles by interaction with the incident ionizing radiation, wherein a thickness of the block is at least equal to one-tenth of a mean free path traveled by the incident ionizing radiation through the converting material;

parallel slits crossing the block, the slits filled with a fluid configured to interact with the secondary particles to produce tertiary particles indicative in intensity and position of the incident ionizing radiation, wherein the block is positioned to ensure that the incident ionizing radiation comes in on a first block face where the slits terminate; and a supplementary layer formed on an additional electrically insulating layer, the additional electrically insulating layer being formed on the last layer of the converting material, located at a second block face which is located opposite said first block face, wherein the supplementary layer is made of an electrically conducting material configured to absorb the secondary particles created in the last layer, and the supplementary and additional layers have said slits running through them.

17. Detector for incident ionizing radiation comprising primary particles whose energies are greater than or equal to 100 keV, the detector including:

a block of converting material configured to release secondary particles by interaction with the incident ionizing radiation, wherein a thickness of the block is at least equal to one-tenth of a mean free path traveled by the incident ionizing radiation through the converting material;

holes crossing the block, the holes filled with a fluid configured to interact with the secondary particles to produce tertiary particles indicative in intensity and position of the incident ionizing radiation, wherein the block is positioned to ensure that the incident ionizing radiation comes in on a first block face where the holes terminate; and a supplementary layer formed on an additional electrically insulating layer, the additional electrically insulating layer being formed on the last layer of the converting material, located at a second block face which is located opposite said first block face, wherein the supplementary layer is made of an electrically conducting material configured to absorb the secondary particles created in the last layer, and the supplementary and additional layers have said holes running through them.

* * * * *